United States Patent
Creviston et al.

(10) Patent No.: US 7,365,471 B2
(45) Date of Patent: Apr. 29, 2008

(54) INTERNAL COOLING FAN WITH A NON-REPEATING BLADE CONFIGURATION

(75) Inventors: Alex Creviston, Muncie, IN (US); Michael McCord, Anderson, IN (US); Chris Bledsoe, Anderson, IN (US); David Maley, Anderson, IN (US)

(73) Assignee: Remy Inc., Anderson, IN (US)

( * ) Notice: Subject to any disclaimer, the term of this patent is extended or adjusted under 35 U.S.C. 154(b) by 0 days.

(21) Appl. No.: 11/260,136

(22) Filed: Oct. 28, 2005

(65) Prior Publication Data
US 2006/0197404 A1 Sep. 7, 2006

Related U.S. Application Data

(63) Continuation-in-part of application No. 11/071,439, filed on Mar. 4, 2005, now Pat. No. 7,274,121.

(51) Int. Cl.
*H02K 1/22* (2006.01)
*H02K 1/24* (2006.01)
*H02K 9/04* (2006.01)
*H02K 9/06* (2006.01)

(52) U.S. Cl. .................. 310/263; 310/61; 310/62; 310/63

(58) Field of Classification Search ............ 310/58–59, 310/61–63, 263, 261; 415/175, 177, 178, 415/204, 208.3, 211.1, 211.2; 416/183, 175, 416/203, 237, 134 R, 204 R, 210 R
See application file for complete search history.

(56) References Cited

U.S. PATENT DOCUMENTS

| | | |
|---|---|---|
| 3,906,266 A | 9/1975 | Cowman |
| 3,973,151 A | 8/1976 | Bowcott |
| 4,322,647 A | 3/1982 | Neroda et al. |
| 4,418,295 A * | 11/1983 | Shiga .......................... 310/59 |
| 4,469,968 A | 9/1984 | Jaeschke |
| 4,549,103 A * | 10/1985 | Shiga ....................... 310/60 R |
| 4,686,399 A | 8/1987 | Imori et al. |
| 5,028,826 A * | 7/1991 | Kitamura ..................... 310/51 |
| 5,329,199 A | 7/1994 | Yockey et al. |
| 5,464,323 A * | 11/1995 | Scofield .................. 416/134 R |
| 5,742,107 A * | 4/1998 | Asao et al. ................... 310/62 |
| 5,977,668 A | 11/1999 | Yoshioka |
| 6,318,964 B1 * | 11/2001 | Yang ......................... 416/185 |

(Continued)

FOREIGN PATENT DOCUMENTS

JP 4-200255 7/1992

*Primary Examiner*—Tran Nguyen
(74) *Attorney, Agent, or Firm*—Finnegan, Henderson, Farabow, Garrett & Dunner, L.L.P.

(57) ABSTRACT

An internal cooling fan assembly for use with a claw-pole segment of a rotor assembly is provided that maximizes air flow while providing a reduced sound signature. The fan assembly includes a base portion that contacts the claw-pole segment when the fan assembly is mounted to the claw-pole segment. The fan assembly also includes a number of blades extending from the base portion such that the blades project outward from a plane normal to the rotor. The plurality of blades have a geometry that aligns with roots of the claw-pole segment. In addition, a first blade of the number of blades is of a first configuration and a second blade of the number of blades is of a second configuration different from the first configuration.

24 Claims, 7 Drawing Sheets

U.S. PATENT DOCUMENTS

| | | |
|---|---|---|
| 6,538,352 B2 | 3/2003 | Asao |
| 6,648,602 B2 * | 11/2003 | Horng et al. ............... 416/203 |
| 6,703,759 B2 | 3/2004 | Oohashi et al. |
| 2005/0006975 A1 | 1/2005 | Bradfield et al. |

* cited by examiner

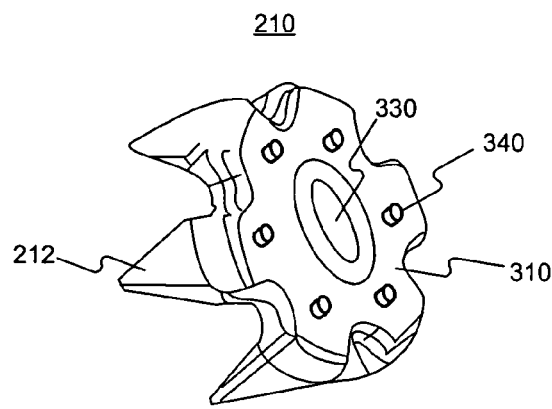
Fig. 3A
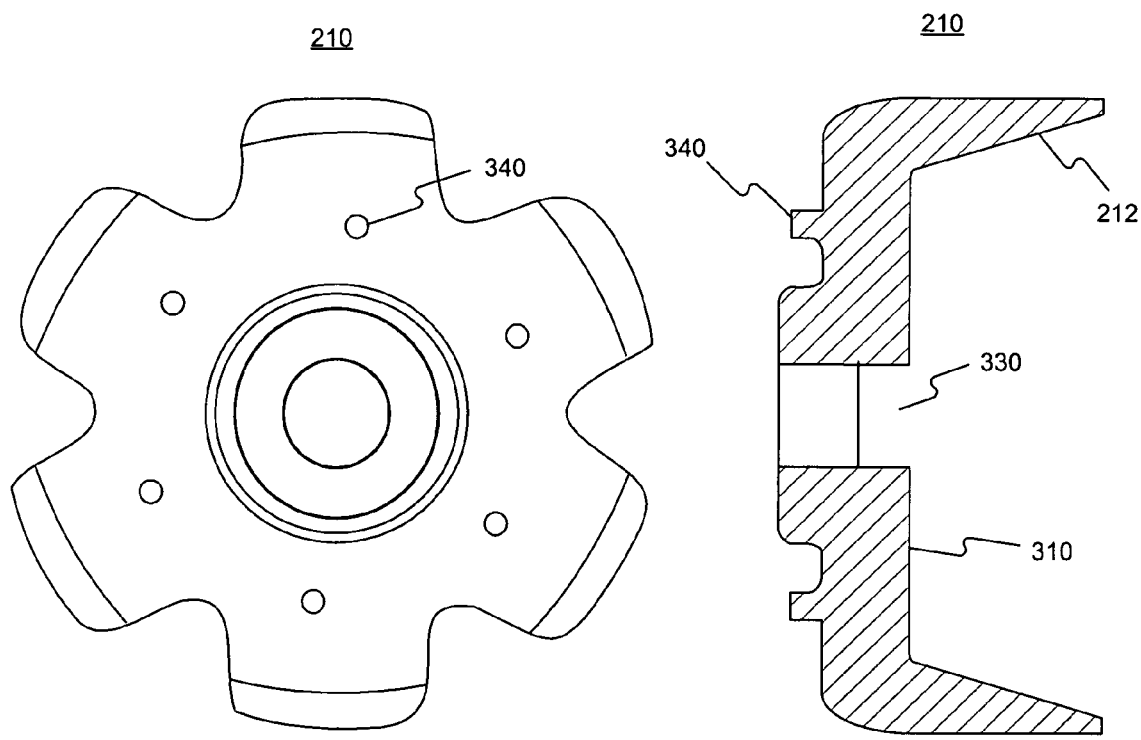
Fig. 3B
Fig. 3C

Fig. 5A
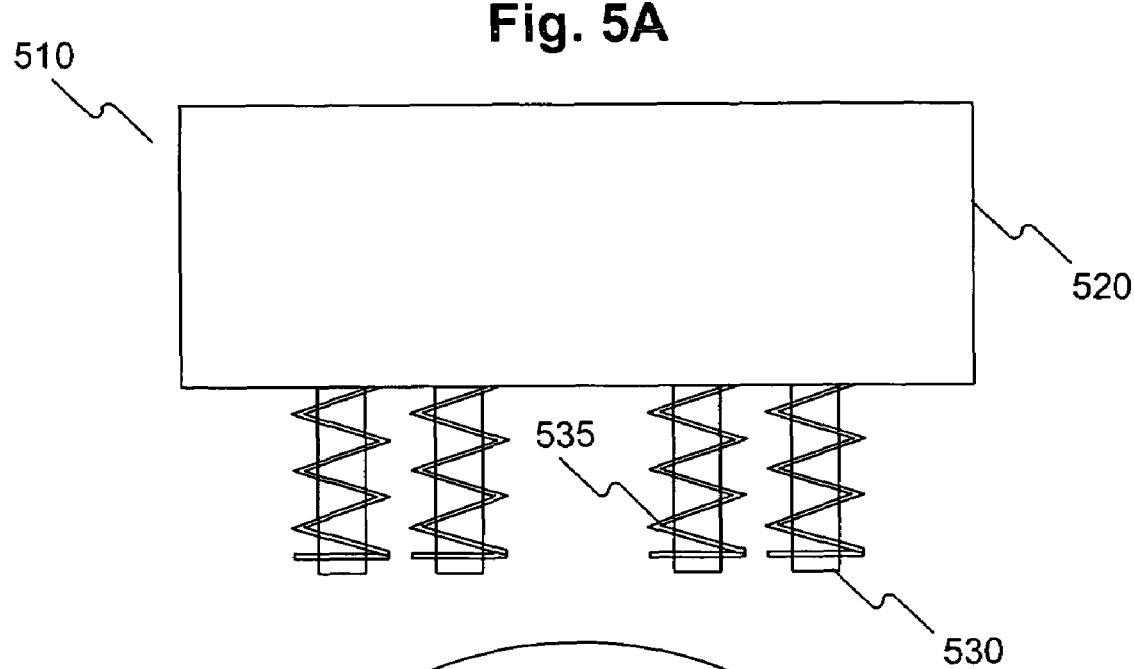
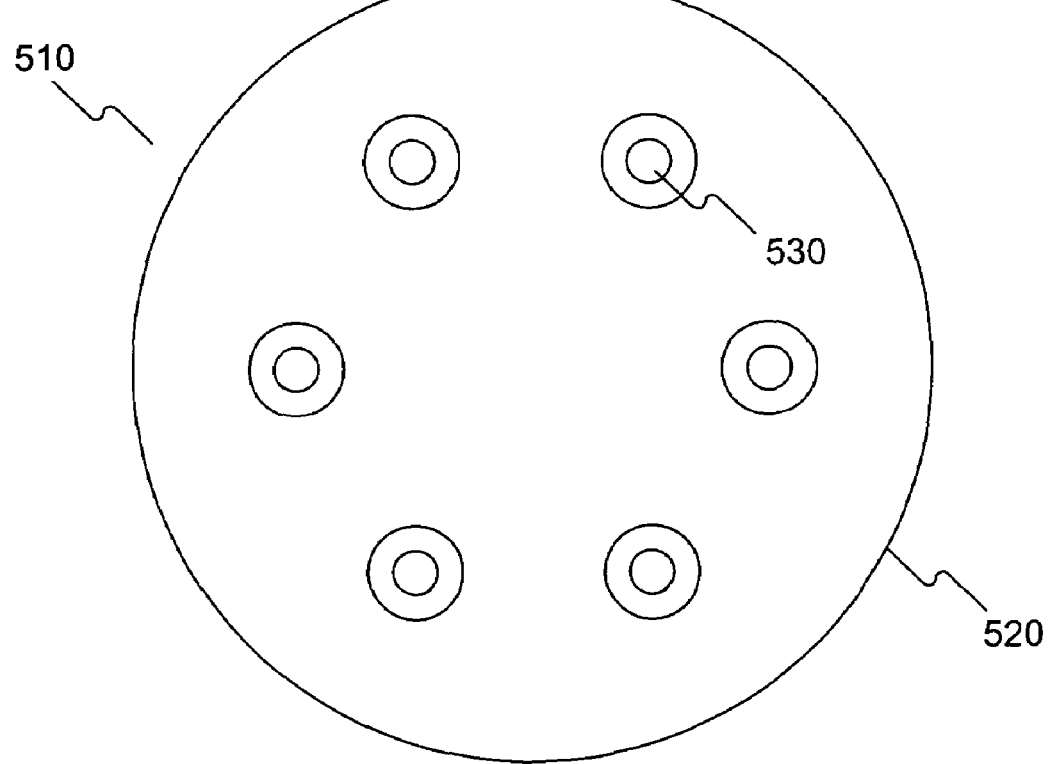
Fig. 5B

600

INTERNAL COOLING FAN WITH A NON-REPEATING BLADE CONFIGURATION

RELATED APPLICATION

This application is a continuation-in-part of U.S. Patent application Ser. No. 11/071,439, filed Mar. 4, 2005 now U.S. Pat. No. 7,274,121, the disclosure of which is incorporated herein by reference in its entirety.

TECHNICAL FIELD

The present invention generally relates to electro-mechanical machines and, more particularly, to an internal cooling fan with a non-repeating blade configuration for use in an electro-mechanical machine, such as an alternator.

BACKGROUND

Electro-mechanical machines are widespread. Rotating electro-mechanical machines, such as dynamoelectric machines (generators and alternators) and motors, are particularly prevalent. Rotating electro-mechanical machines usually include a stationary member, known as a "stator," and a rotating member, known as a "rotor," which turns in relation to the stator. In certain types of machines, the rotor (sometimes referred to as an "armature") rotates within the stator (or "field"), which produces a rotating magnetic field. In other types of machines, the rotor produces a magnetic field, which produces an electrical current in the stator.

One common rotating electro-mechanical machine design is the Lundell, or "claw-pole," design. In a claw-pole machine, the rotor includes claw-shaped pole segments (usually a pair of segments) located around one or more field windings. The pole segments have claw-shaped magnetic poles (or roots) and are affixed around the winding such that the claws mesh together. FIG. 1 shows a conventional claw-pole rotor assembly 100 used in an alternator. As illustrated, a pair of claw-pole segments (110) surround a field winding (120) and the claws (112) of the segments (110) intermesh.

Adequate and proper cooling of claw-pole machines is vital to ensure proper and prolonged operation. Internal cooling fans are commonly used to cool claw-pole machines. Referring again to FIG. 1, rotor assembly 100 includes two internal cooling fans (131, 132). Internal cooling fans, such as fans 131 and 132, are usually attached to the pole segments by welding or frictional clamping.

Conventional internal cooling fan attachment techniques are deficient in a variety of aspects. With conventional techniques, the choice of internal cooling fan material is restricted. For example, in order to weld a fan to a pole segment, the fan must be formed from a suitable material, such as steel. Further, conventional attachment systems may be prone to fatigue and/or failure. Clamps and welds may degrade and eventually fail during prolonged operation. In addition, present attachment techniques do not account for fan alignment.

In addition, conventional internal cooling fan designs are deficient in a variety of aspects. Conventional fans are typically designed with symmetric fan blades that align with the machine segment claws. These symmetric fan designs tend to drive irritating tonal noise. To improve the sound signature, staggered fans are often used. Staggered internal cooling fans utilize asymmetric spacing between blades, which reduces tonal noise, relative to symmetric designs. Staggered fans, however, cannot be aligned with the segment claw roots. This reduces the airflow realized along the rotor axis of the machine.

SUMMARY

Methods, systems, and articles of manufacture consistent with the present invention may obviate one or more of the above and/or other issues. Consistent with the present invention, an internal cooling fan may be provided that maximizes airflow and reduces fan noise. In one example, an internal cooling fan with a non-repeating pattern of blade angles is provided that allows symmetric alignment with claw segments, to maximize air flow while providing a sound signature comparable to fans with asymmetric fan blade spacing.

Although claw-pole machines, particularly alternators, are described herein, the present invention is not inherently related or limited to such machines. Aspects of the present invention may be used and/or adapted to fit various types and sizes of mechanisms.

Consistent with the present invention, an internal cooling fan assembly for use with a claw-pole segment of a rotor assembly may be provided. The fan assembly may comprise: a base portion that contacts the claw-pole segment when the fan assembly is mounted to the claw-pole segment; and a number of blades extending from the base portion such that the blades project outward from a plane normal to the rotor; wherein the plurality of blades have a geometry that aligns with roots of the claw-pole segment, and wherein a first blade of the number of blades is of a first configuration and a second blade of the number of blades is of a second configuration different from the first configuration.

Consistent with the present invention, a system may be provided. The system may comprise: an electro-mechanical machine having a rotor that includes a claw-pole segment, the rotor located along an axis of the electro-mechanical machine, and the claw-pole segment having a base and at least one claw projecting axially from the base; and a fan assembly that attaches to the claw-pole segment, the fan assembly comprising: a base portion that contacts the claw-pole segment when the fan assembly is mounted to the claw-pole segment; and a plurality of blades extending from the base portion such that the blades project outward from a plane normal to the rotor axis of the electro-mechanical machine; wherein the plurality of blades have a geometry that aligns with roots of the claw-pole segment, and wherein the plurality of blades are arranged in a non-repeating pattern.

The foregoing background and summary are not intended to be comprehensive, but instead serve to help artisans of ordinary skill understand the following implementations consistent with the invention set forth in the appended claims. In addition, the foregoing background and summary are not intended to provide any independent limitations on the claimed invention.

BRIEF DESCRIPTION OF THE DRAWINGS

The accompanying drawings show features of implementations consistent with the present invention and, together with the corresponding written description, help explain principles associated with the invention. In the drawings:

FIGS. 3A-C collaboratively illustrate a claw-pole segment consistent with the present invention;

FIGS. 5A and 5B collaboratively illustrate views of an exemplary upset tool consistent with the present invention.

DETAILED DESCRIPTION

The following description refers to the accompanying drawings, in which, in the absence of a contrary representation, the same numbers in different drawings represent similar elements. The implementations set forth in the following description do not represent all implementations consistent with the claimed invention. Instead, they are merely some examples of systems and methods consistent with the invention. Other implementations may be used and structural and procedural changes may be made without departing from the scope of present invention.

Figure 1:
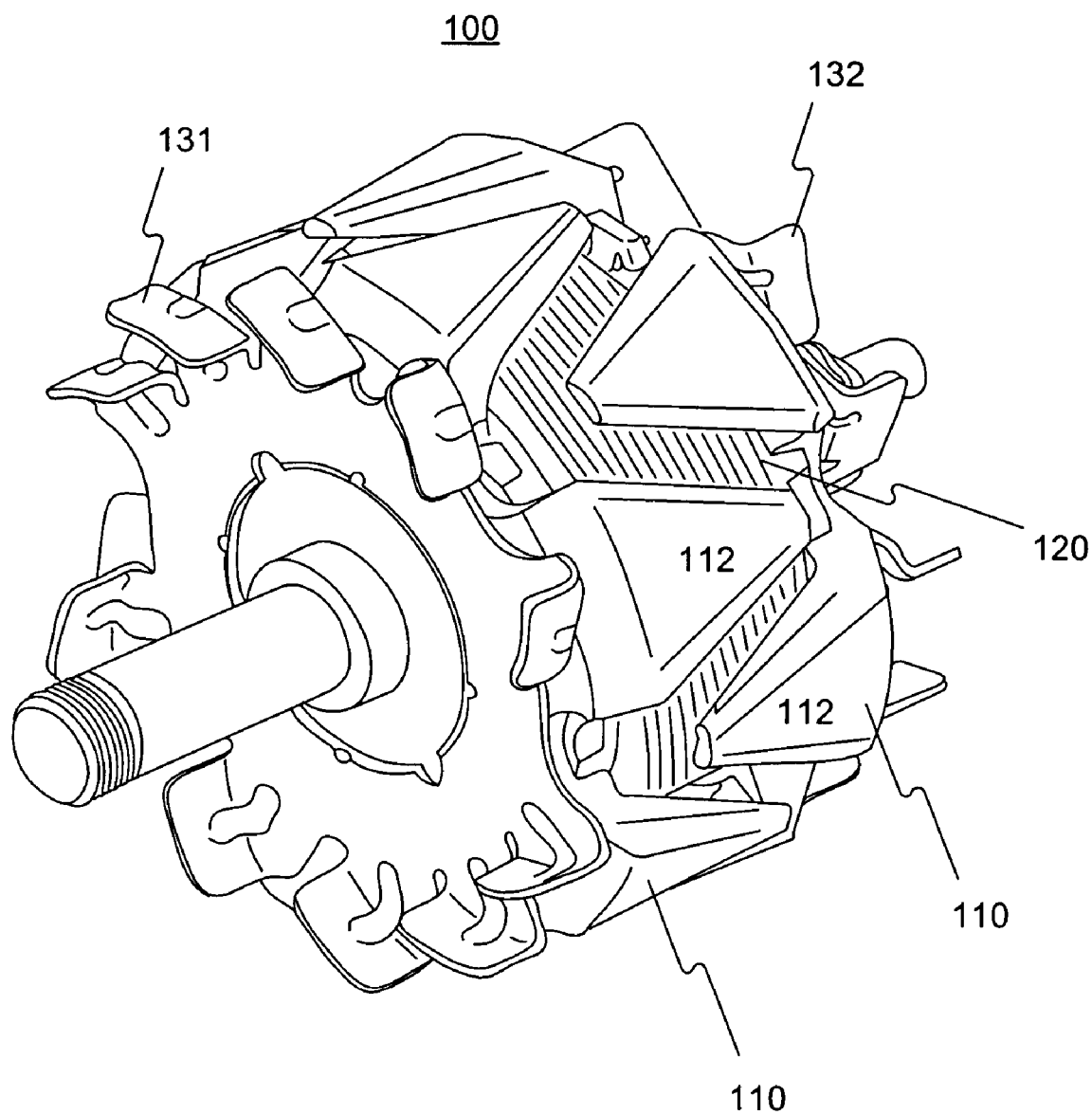
FIG. 1 illustrates a conventional claw-pole rotor assembly.
Figure 2:
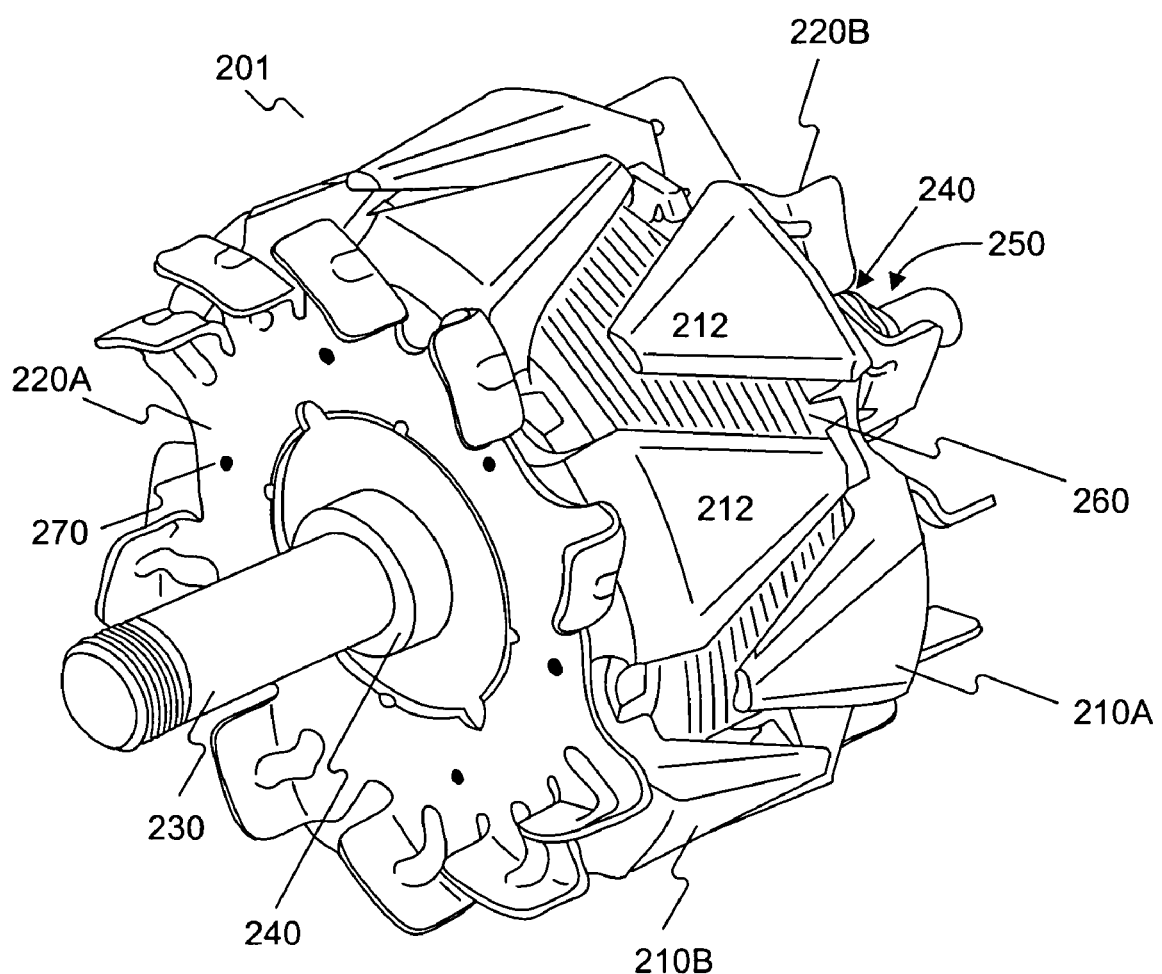
FIG. 2 illustrates an exemplary system consistent with the present invention.

FIG. 2 illustrates an exemplary system 200 consistent with the present invention. As illustrated, system 200 may include a claw-pole rotor assembly 201 suitable for use in an electro-mechanical machine (not shown). System 200 may also include one or more tools (also not shown) used for assembling rotor assembly 201. An example of such a tool is described below in connection with FIGS. 5A and 5B.

Rotor assembly 201 may be suitable for use and implemented in a variety electro-mechanical machines, such as machines that convert mechanical energy into electrical energy (i.e., dynamoelectric machines), machines that convert electrical energy into mechanical energy (e.g., motors), and various other rotating machines such as meters, torquers, etc. Rotor assembly 201 may also may suitable for use in a hybrid-drive motor. Rotor assembly 201 may be a component of and/or a located within such machines and systems. Rotor assembly 201 may be suitable for use in a variety of applications, including motor vehicle, material handling, marine, and off-road applications. In one particular example, rotor assembly 201 may be used in a claw-pole alternator for an automotive application. In such an implementation, rotor assembly 201 may be located within an alternator housing and may rotate in relation to a stator.

Electro-mechanical machines in which assembly 201 may be implemented may include various components known in the art, such as stator assemblies, solenoid assemblies, controllers, pulleys, belts, springs, gears, brushes, casings, brackets, valves, seals, pins, sensors, terminals, external fan assemblies, etc. Such machines may also include appropriate air intake and discharge apertures (e.g., located in the casings and/or brackets) to facilitate air flow. In certain configurations, assembly 201 may additionally include or be coupled to one or more regulators (not shown) for adjusting voltage from a stator and one or more rectifiers (e.g., a diode rectifier bridge) (also not shown) for converting alternating current into direct current. Such regulators and rectifiers are known in the art.

Rotor assembly 201 may include one or more claw-pole segments 210 and one or more internal cooling fans 220. Rotor assembly 201 may also include various rotor components known in the art, such as a rotor shaft 230, one or more bearings 240, one or more slip rings 250 that supply electrical current to assembly 201, and one or more field coil windings 260 that generate magnetic flux. Internal cooling fans 220 may be fastened to claw-pole segments 210 using various techniques known in the art, such as welding and frictional clamping. Alternatively, internal cooling fans 220 may be fastened to claw-pole segments 210 via one or more protrusions 270 formed on claw-pole segment 210 and corresponding openings in fans 220. Additional details of the protrusions, as well as details regarding fastening, are discussed below in connection with FIGS. 3-5.

In the configuration illustrated in FIG. 2, assembly 201 includes a pair of claw-pole segments (210A, 210B) and a corresponding pair of fans (220A, 220B). Assembly 201 may, however, include a fewer or greater number of claw-pole segments than what is illustrated in FIG. 2. For example, a third claw-pole segment may be interposed between two end segments. Likewise, assembly 201 may include a fewer or greater number of fans than the number illustrated. For example, in one implementation, assembly 201 may include a single fan for the pulley side of the machine.

Each claw-pole segment 210 of assembly 201 may include one or more claw-shaped poles 212. When affixed in assembly 201, the claw-pole segments 210 may surround one or more field windings and the claw-shaped poles 212 may intermesh. For example, the pair of claw-pole segments (210A, 210B) shown in FIG. 2 may be positioned around field coil windings 260 such that the claw poles 212 of each segment mesh together. The claw poles 212 may mesh such that every other claw pole is connected to a different end of the winding. In one configuration, the field coil winding may be located between each pole segment, resulting in a pair of field windings. During operation, current passes through the winding(s) and a magnetic field is generated, which is conducted by the claw poles 212.

Internal cooling fans 220 may be configured to draw and drive air to provide ventilation to rotor assembly 201. For example, fan 220A may drive air into the drive end of the assembly and fan 220B may draw air into the slip ring end of the assembly. In one example, internal cooling fans 220 may include centrifugal fans, each including a plurality of blades located around an impeller. Internal cooling fans 220 may operate in conjunction with appropriate air intake and discharge apertures of an electro-mechanical machine in which assembly 210 is implemented to facilitate air flow.

FIGS. 3A-C illustrate detailed views of an example of a claw-pole segment 210 consistent with the present invention. Claw-pole segment 210 may include a base portion 310, and one or more claw-shaped magnetic poles 212 extending from the base. As illustrated in FIGS. 3A-C, the base portion 310 may be circular in shape and the claw-shaped poles 212 may be positioned around the circumference of the base, projecting axially from the base. Base 310 may include an opening 330 in its center so that it can be inserted on a rotor shaft (e.g., shaft 230). The particular diameter of opening 330 will vary dependent upon the application. The claw poles 212 may be evenly spaced around base 310 and may be formed with a tapered shape. In one example, claw-pole segment 210 may include P/2 claw poles, where P is an even number representing the total number of poles. The exact number of claw poles, as well as their particular size, shape, and positioning, will vary depending on the particular machine and application and are not limited to what is shown in FIG. 2 or 3. Similarly, the size and shape of the base portion will vary and are not limited to what is illustrated.

Claw-pole segment 210 may optionally include one or more protrusions 340 for attaching an internal cooling fan (e.g., fan 220) to the segment. As shown in FIGS. 3A-3C, the protrusions may be formed on base 310 of claw-pole segment 210 and may extend axially from the base in a direction opposite the direction in which the claw poles extend. That is, the protrusions may be formed on the face of base 310 opposite the face from which claw poles 212 extend. Protrusions 340 may be formed in various shapes and sizes, depending on the application. In one example, protrusions 340 may be posts or pin-shaped. In addition, the protrusions may be tapered. In one particular example, each protrusion may be pin-shaped and tapered, having a 5.5 mm nominal diameter at the protrusion base and extending 4.8 mm out from base 310 with a 2-degree draft. Any number of protrusions 340 may be formed on claw-pole segment 300. Further, protrusions may be positioned in various arrangements and patterns on claw-pole segment 210. In the configuration illustrated in FIG. 3A, claw-pole segment 210 may include six protrusions 340 positioned in a circular arrangement on the base.

Each protrusion 340 may include a head portion that is upset by the application of an axial load or upset force. For example, the head portion may expand in response to an axial load similar to a rivet. In one implementation, each protrusion 340 may include a head portion that expands to 6.5-6.6 mm in response to an axial load. The amount of force or pressure required to upset the protrusion head will vary, depending on the application. Similarly, protrusions 340 may be formed to withstand various amounts of stress, depending on the application. In one example, protrusions 340 may withstand 7000N and the protrusion heads may upset upon application of 24000N.

In certain implementations, each of the base portion 310, poles 212, and protrusions 340 of claw-pole segment 210 may be formed from the same material, which may include, for example, a metal, such as steel, iron, and aluminum, or an alloy. In addition, the head portions of protrusions 340 may be made of the same material as the protrusions, and a given protrusion and its head portion may be a single piece. Claw-pole segment 210, including base portion 310, poles 212, and protrusions 340, may be formed, or fabricated, using a variety of techniques/processes. For example, claw-pole segment 210 may be formed using various forging processes, such as impression die forging, precision forging, press forging, upset forging. Claw-pole segment 210 may be forged using hot, warm or cold forging. In addition, claw-pole segment 210 may be formed using various machining processes and/or casting processes, such as centrifugal casting and die-casting. Various computer aided techniques, such as CAD, CAM, and CAE, may be used with the various forming processes.

In one particular example, claw-pole segment 210 may be formed using a hot forging process. The forging process may include forming heated metal into a specialized mold or die. The specialized mold may have the desired shape of the claw-pole segment, including the base, claws, and protrusions. The metal may be formed using compressive force, which may be provided by a press or power hammer.

Figure 4A:
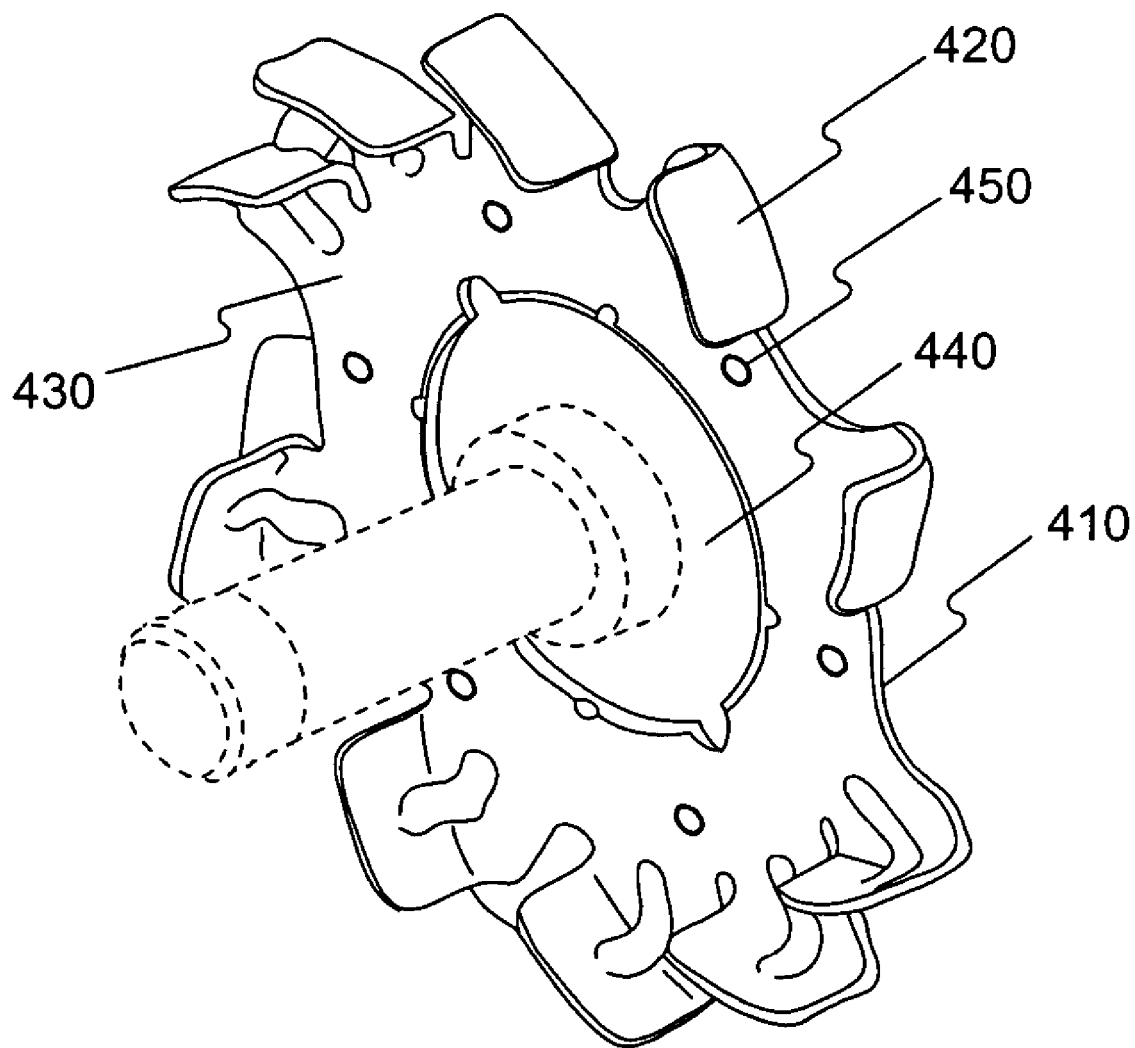
FIG. 4A illustrates an exemplary internal cooling fan assembly consistent with the present invention.

FIG. 4A illustrates a detailed view of an example of an internal cooling fan 220 consistent with the present invention. As illustrated, fan 220 may include a base portion 410 and one or more fan blades 420 dispersed around the periphery of the base's outward face 430.

Base portion 410 may make contact with a given claw-pole segment when the fan is mounted on the claw-pole segment. The configuration of base portion 410 will vary depending on the particular claw-pole segment and machine. In one configuration, as illustrated in FIG. 4A, base portion 410 may be circular in shape. Base portion 410 may, for example, be 50 mm in diameter, with a 1.2 mm thickness. Internal cooling fan 220 may also include an opening 440 in base 410 so that it can be inserted on a rotor shaft (e.g., shaft 230). The particular size and shape of opening 440 will vary dependent upon the application. In one example, opening 440 may be circular in shape with a 45 mm inner diameter (ID). Although illustrated as circular, base portion 410 and opening 440 may be formed in a variety of other shapes.

Fan blades 420 may project out axially from base 410 such that air can be drawn in and driven between the blades. In one configuration, fan blades 420 may extend from the base portion 410 such that the blades project outward from a plane normal to the rotor (i.e., a plane parallel to the base's outwardly directed face 430). In other words, fan blades 420 may extend out at angles from the base portion such that they do not contact the claw-pole segment when mounted.

Consistent with the present invention, fan blades 420 may be arranged in a geometry that aligns with the roots (i.e., claws) of the claw-pole segment so that a maximized flow is realized along the rotor axis of the machine. For example, internal cooling fan 220 may include the same number of blades as the alternator segment has claws and the blades may be spaced in a manner corresponding to the spacing of the claws. In one configuration, fan 220 may include six (6) blades, to correspond to six (6) claws of an alternator segment. Each blade may be, for example, 27 mm (length)× 16 mm (width) in size.

In one configuration, internal cooling fan 220 may include one or more openings 450 for receiving the protrusions on a given claw-pole segment. The openings 450 may be located in base 410 or in a portion of the fan blades. The number, size, and arrangement of the openings will vary depending on the particular claw-pole segment and machine. In one example, cooling fan 220 may include six openings spaced in a circular pattern in base 410, each 5.65 mm in diameter to accommodate the protrusions. Openings 450 may be arranged to accommodate the spacing, shape, size, and angle of the fan blades.

The various components of internal cooling fan 220 may be formed from a variety of materials, such as plastics, resins (such as, acrylic, Acrylonitrile-Butadiene-Styrene (ABS), epoxies, etc.), metals (such as steel and aluminum), alloys, and composite materials. In one particular example, internal cooling fan 220 may be formed from plastic. Each of the various components of internal cooling fan 220 may formed from the same material or from different materials. Internal cooling fan 220 may be fabricated using a variety of forming and/or molding techniques, such as thermoforming, injection molding, and pressure forming. Forging, casting and/or machining may also be used.

Consistent with the present invention, fan blades may be formed with varying configurations (e.g., size, shape, spacing, angle, etc.) to affect (e.g., lower or break up) the frequency response of the fan. That is, one or more of the blades of a particular fan may have a different size, shape, spacing, and/or angle from one or more other blades of the fan. In one configuration, fan blades may be arranged such that a non-repeating pattern of blade configurations is achieved. For example, one or more blades may be 25 mm×15 mm in size, others may be 25 mm×12 mm in size, and others may be 25 mm×13 mm in size.

Figure 4B:
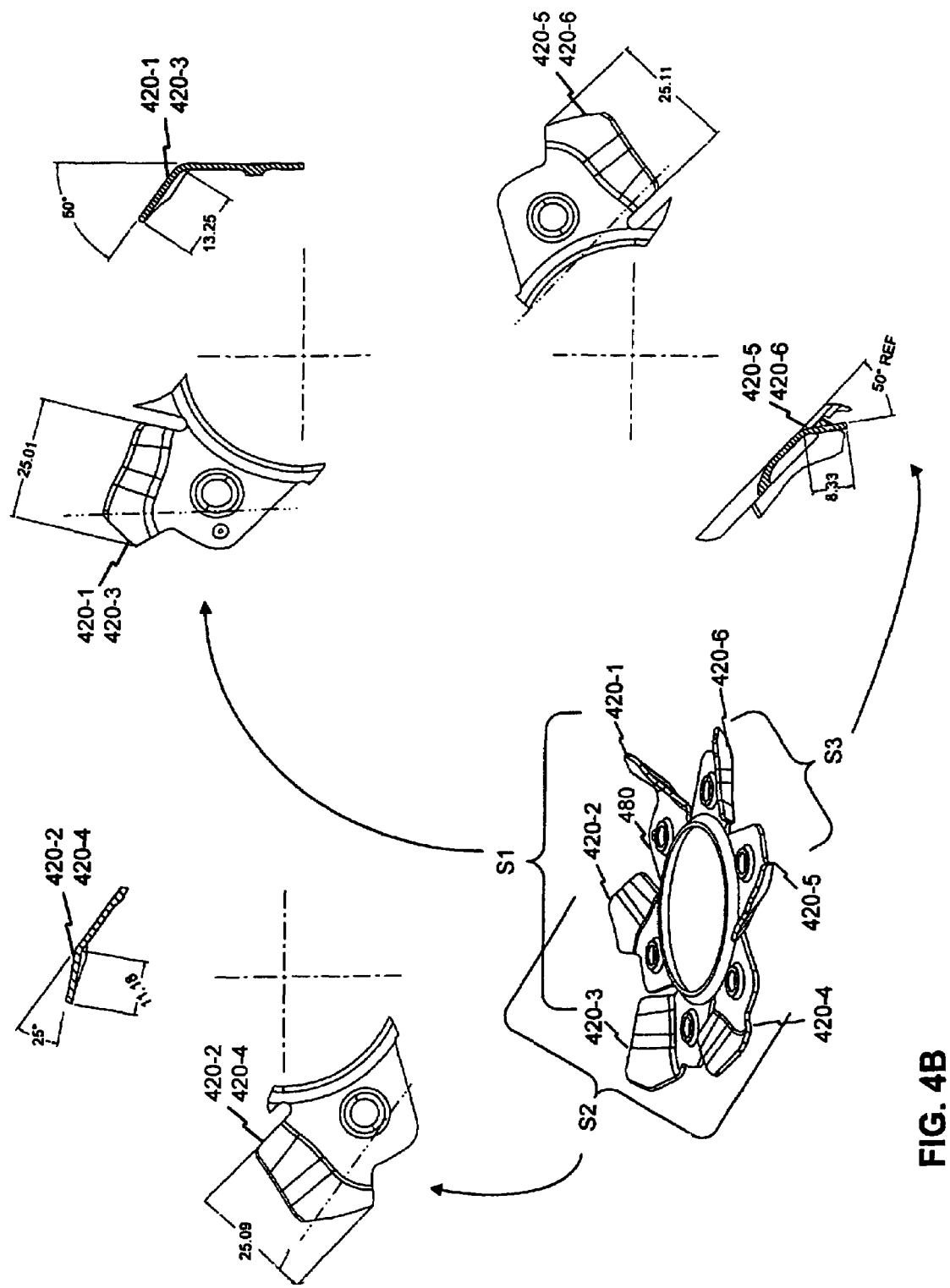
FIG. 4B illustrates an exemplary internal cooling fan assembly configuration consistent with the present invention.

FIG. 4B illustrates an internal cooling fan 475 that includes fan blades that vary in configuration. Internal cooling fan 475 may include a base portion 480 that makes contact with a given claw-pole segment when the fan is mounted, and it may include one or more fan blades 420 extending out from the base portion such that they do not contact the claw-pole segment when mounted. Similar to fan 220, internal cooling fan 475 may include an opening 490 in its base so that it can be inserted on a rotor shaft (e.g., shaft 230). The particular diameter of opening 490 will vary dependent upon the application. Fan 475 may also include one or more openings 495 in its base for receiving the protrusions on a given claw-pole segment, similar to fan 220. The openings may be arranged to accommodate the spacing, shape, size, and angle of the fan blades. In one example, openings 495 may be unequally spaced to accommodate unequally spaced blades. Alternatively, the openings may be equally spaced around the fan but positioned differently with respect to each blade. Internal cooling fan 475 may be formed from various materials and by using various techniques, such as those described above in connection with fan 220.

Consistent with present invention, fan blades 420 may be set at different angles with respect to a plane normal to the rotor axis of the machine. Each blade may be set at a different angle, or certain blades may be set at the same angle while other blades are set a different angle. Fan blades 420 may be arranged such that a non-repeating pattern of blade angles is achieved. In one example, fan blades 420 may be set at 56-, 40-, and 20-degree angles with respect to the base portion such that a non-repeating pattern of blade angles is achieved. The differing angles change the position of the leading edge of the blades with respect to one another. This produces a staggered or asymmetric pressure pulse from the fan during operation. The asymmetric configuration lowers tonal or discreet frequency noise, resulting in a lower overall noise level and an improved overall machine sound signature.

Fan blades 420 of a particular fan assembly may differ in configuration in a single respect. For example, the blades may be similar in shape, size, and spacing but arranged in a non-repeating pattern of angles. Alternatively, fan blades 420 may vary in configuration in more than one respect. For example, fan blades 420 may differ in angle and size, angle and spacing, angle and shape, size and spacing, angle, size, and shape, etc. to affect the frequency response of the fan.

In one configuration, fan blades 420 may be arranged in a geometry that aligns with the roots (i.e., claws) of the claw-pole segment so that a maximized flow is realized along the rotor axis of the machine. In such a configuration, the blades may be additionally arranged in a non-repeating pattern of angles. For example, the number of blades may be equal to the number of alternator segment claws and the blades may be aligned with the claw spacing, but the blades may be arranged with differing angles with respect to a plane normal to the rotor axis of the machine.

Fan blades 420 may therefore be symmetrically aligned with claw segments (symmetric spacing) but set at differing angles with respect to a plane normal to the rotor axis. The alignment of the fan blades with the claws maximizes airflow along the rotor axis of the machine while the non-repeating angle arrangement lowers tonal or discreet frequency noise. In this fashion, internal cooling fan 220 provides a sound signature comparable to fans with asymmetric fan blade spacing without reducing airflow.

In certain configurations, fan blades 420 may be arranged in one or more blade sets. For example, as illustrated in FIG. 4B, internal cooling fan 220 may include six blades (420-1, 420-2, 420-3, 420-4, 420-5, and 420-6) that are arranged in three sets of two (S1, S2, and S3). The number of blades and sets are not limited to what is illustrated. In an alternative implementation, fan 220 may include, for example, seven blades arranged in two three-blade sets and one one-blade set, or in three two-blade sets and one one-blade set. Blades in a particular set may be adjacent to each other or may be dispersed between blades of other sets. For example, as illustrated in FIG. 5, the first set (S1) may include the first (420-1) and third (420-3) blades, the second set (S2) may include the second (420-2) and forth (420-4) blades, and the third set (S3) may include the fifth (420-5) and sixth (420-6) blades. In that arrangement, the first and second sets are intermeshed and the blades of the third set are adjacent.

Each blade in a given set may be identical in shape, size, and angle, but each set may be different from every other set. As an example, referring again to FIG. 5, the blades in the first set (S1) may be 25 mm×15 mm in size and set at a 56-degree angle with respect to the base portion, the blades in the second set (S2) may be 25 mm×12 mm in size and set at a 20-degree angle, and the blades in the third set (S3) may be 25 mm×13 mm in size and set a 40-degree angle. Each set of blades may be unequally or equally spaced from other sets on the fan. Also, the space between each blade in a set may vary or be the same in each of the sets.

As noted above, internal cooling fan 220 may be fastened or attached to a claw-pole segment (e.g., 210) using protrusions 340 formed on the claw-pole segment. The fan may be located (using the protrusions) on the claw-pole segment such that the protrusions extend through and beyond the corresponding openings in the fan (e.g., 2.0-2.5 mm beyond the openings). The portions of the protrusions extending beyond the openings in the fan may be upset by an axial load to secure the fan attachment to the claw-pole segment.

FIGS. 5A and 5B collaboratively illustrate views of an exemplary upset tool 510 that may apply an axial load to the protrusions to secure internal cooling fans (220, 475) to claw-pole segment 340. As illustrated in FIGS. 5A and 5B, upset tool 510 may include a base 520 and a plurality of rods 530 extending out from the base. Each rod 530 may be surrounded by a spring 535. Rods 530 may correspond to the protrusions on a given claw-pole segment. The number of rods will therefore vary depending on the application. In one implementation, each of rods 530 may be 10 mm in diameter and extend 20 mm from base 520, which may be 50 mm in thickness with a 110 mm diameter. The size of the rods and the base may vary depending on the particular claw-pole segment and the size of its protrusions. Base 510 and rods 530 may, in one example, be formed from steel.

Upset tool 510 may include a drive mechanism (not shown) for driving base 520 and rods 530 with varying amounts of force to provide axial loads to claw-pole segment protrusions. Upset tool 510 may be configured to apply an axial load sufficient to provide each protrusion with an adequate upset force. For example, if the claw-pole segment includes six protrusions, upset tool 510 may be configured to apply an axial load of 35000 lbs, providing approximately 5800 lbs to each protrusion. The drive mechanism may utilize various known components and technologies, such as hydraulics, motors, etc.

In operation, springs 535 may contact the fan assembly to hold it in place while base 510 and rods 530 are driven to apply an axial load to the claw-pole segment protrusions. The axial load may upset the protrusions, thereby securing the fan to the claw-pole segment.

For purposes of explanation only, aspects of system 200, including claw-pole segment 210, internal cooling fans 220 and 475, and upset tool 510 are described with reference to the elements and components illustrated in FIGS. 2-5. The number, shape and arrangement of components in claw-pole segment 210, fans 220 and 475, and upset tool 510 are not limited to what is shown and other variations in the number, shape and arrangement of components are possible, consistent with the present invention. Further, depending on the implementation, system 200, claw-pole segment 210, fans 220 and 475, and upset tool 510 may lack certain illustrated components and/or contain, or be coupled to, additional or varying components not shown.

Figure 6:
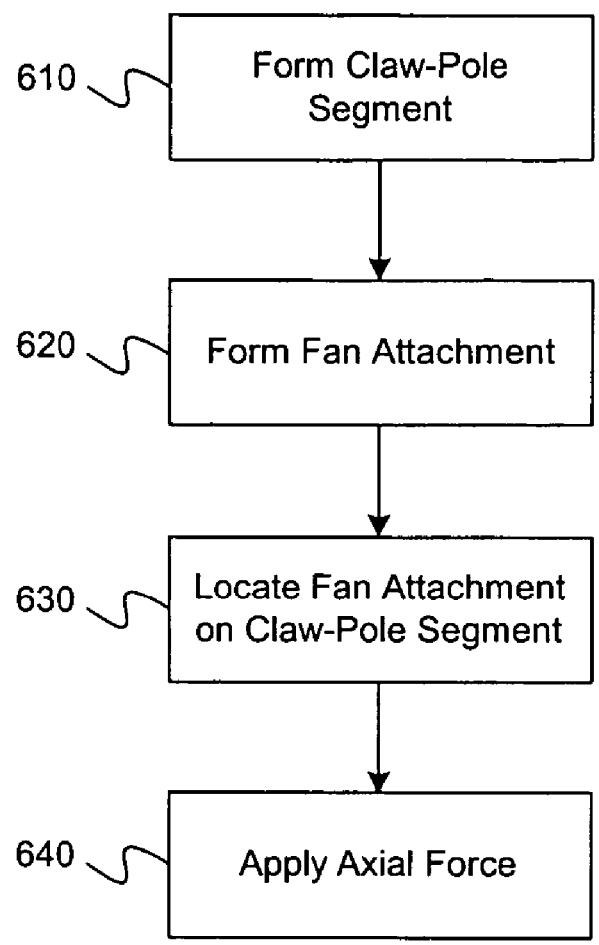
FIG. 6 is a flowchart depicting an exemplary coil forming method consistent with the present invention.

FIG. 6 is a flowchart depicting an exemplary method 600 of fastening a fan attachment to a claw-pole segment of a rotating machine consistent with the present invention. Method 600 may be used to fasten internal cooling fan 220, or fan 475, to a claw-pole segment 210.

Method 600 may begin by forming the claw-pole segment (step 610). Forming the claw-pole segment may include forging, casting, and/or machining the claw-pole segment. The claw-pole segment may be formed such that it includes a base portion, claws, and protrusions, as discussed above in connection with FIG. 3. In certain embodiments, forming the claw-pole segment may include generating a specialized mold or die that can be used for fabricating the claw-pole segment. Method 600 may also include forming the fan attachment (step 620). Forming the fan attachment may include performing one or more forming and/or molding techniques, such as thermoforming, injection molding, pressure forming, forging, casting and/or machining. Forming the fan attachment may include forming one or more openings in the attachment that correspond to the protrusions of a given claw-pole segment. In certain embodiments, the claw-pole segment and fan attachment may be formed using one or more forming machines, which may be automated.

After the claw-pole segment and fan attachment are formed, the fan attachment may be located on the claw-pole segment (step 630). The protrusions may serve as guide for aligning and locating the fan on the claw-pole segment. The fan attachment may be located such that the openings receive the protrusions and a portion of each protrusion (e.g., 2.0-2.5 mm of each protrusion) extends through and out of the respective opening. Locating may be performed manually by hand or, as an alternative, automatically by one or more tools, which may be automated.

Once the fan attachment is located on or aligned with the claw-pole segment, an axial force may be applied to the protrusions of the claw-pole segment (step 640). The axial force may be applied in order to upset the portions of the protrusions extending out of the fan attachment openings such that those portions becomes larger than the openings. In this fashion, the protrusions may operate similar to rivets to secure the fan attachment to the claw-pole segment. Applying the axial load to the protrusions may be performed by one or more tools, which may be automated, such as upset tool 510.

FIG. 6 is consistent with an exemplary implementation of the present invention. The sequence of events described in FIG. 6 is exemplary and not intended to be limiting. Other steps may therefore be used, and even with the method depicted in FIG. 6, the particular order of events may vary without departing from the scope of the present invention. Further, the illustrated steps may overlap and/or may exist in fewer steps. Moreover, certain steps may not be present and additional steps may be implemented in method 600. The illustrated steps may also be modified without departing from the scope of the present invention. In addition, the method 600 is not inherently related to any particular apparatus or system and may be implemented in conjunction with any suitable combination of components. Also, all or part of method 600 may be automatically performed without operator intervention.

The foregoing description of possible implementations consistent with the present invention does not represent a comprehensive list of all such implementations or all variations of the implementations described. The description of only some implementations should not be construed as an intent to exclude other implementations. Artisans will understand how to implement the invention in the appended claims in many other ways, using equivalents and alternatives that do not depart from the scope of the following claims.

What is claimed is:

1. An internal cooling fan assembly for use with a claw-pole segment of a rotor assembly, the fan assembly comprising:
   a base portion that contacts the claw-pole segment when the fan assembly is mounted to the claw-pole segment, the base portion including a plurality of radially extending portions; and
   a plurality of blades extending from the radially extending portions such that the blades project outward from a plane normal to the rotor axis;
   wherein the plurality of blades extending from the radially extending portions are angled with respect to the base, and wherein a first blade of the number of blades is of a first configuration and a second blade of the number of blades is of a second configuration different from the first configuration.

2. The internal cooling fan assembly of claim 1, wherein the claw-pole segment includes a number of claws and wherein the number of blades is equal to the number of claws.

3. The internal cooling fan assembly of claim 2, wherein the first configuration includes a first blade angle with respect to the plane normal to the rotor and the second configuration includes a second blade angle, different from the first angle, with respect to the plane normal to the rotor.

4. The internal cooling fan assembly of claim 3, wherein the first configuration includes a first blade size and the second configuration includes a second blade size.

5. The internal cooling fan assembly of claim 3, wherein the first configuration includes a first blade shape and the second configuration includes a second blade shape.

6. The internal cooling fan assembly of claim 1, wherein the first configuration includes a first blade size and the second configuration includes a second blade size.

7. The internal cooling fan assembly of claim 1, wherein the first configuration includes a first blade shape and the second configuration includes a second blade shape.

8. The internal cooling fan assembly of claim 1, wherein the plurality of blades are arranged in sets, and wherein the first blade is a member of a first set and the second blade is a member of a second set.

9. The internal cooling fan assembly of claim 1, wherein a third blade of the number of blades is of a third configuration different from the first and second configurations.

10. The internal cooling fan assembly of claim 1, wherein the base portion includes at least a first opening to accommodate a shaft of the rotor.

11. The internal cooling fan assembly of claim 1, wherein the base portion includes a plurality of openings to accommodate a corresponding plurality of protrusions extending from the claw-pole segment so that the protrusions extend through and beyond the second openings when the fan assembly is mounted to the claw-pole segment.

12. A system comprising:
an electro-mechanical machine having a rotor that includes a claw-pole segment, the rotor located along an axis of the electro-mechanical machine, and the claw-pole segment having a base and at least one claw projecting axially from the base; and
a fan assembly that attaches to the claw-pole segment, the fan assembly comprising:
- a base portion that contacts the claw-pole segment when the fan assembly is mounted to the claw-pole segment, the base portion having a plurality of radially extending portions; and
- a plurality of blades extending from the radially extending portions such that the blades project outward from a plane normal to the rotor axis of the electro-mechanical machine;
- wherein the plurality of blades extending from the radially extending portions are angled with respect to the base, and wherein the plurality of blades are arranged in a non-repeating pattern.

13. The system of claim 12, wherein the electro-mechanical machine includes an alternator.

14. The system of claim 12, wherein the electro-mechanical machine includes a generator.

15. The system of claim 12, wherein the electro-mechanical machine includes a motor.

16. The system of claim 12, wherein the plurality of blades are arranged in a non-repeating pattern of blade angles.

17. The system of claim 16, wherein at least a first of the plurality of blades is of a first shape and at least a second of the plurality of blades is of a second shape different from the first shape.

18. The system of claim 16, wherein at least a first of the plurality of blades is of a first size and at least a second of the plurality of blades is of a second size different from the first size.

19. The system of claim 12, wherein the claw-pole segment includes a number of claws and wherein the plurality of blades corresponds to the number of claws.

20. The system of claim 12, wherein the claw-pole segment includes at least one protrusion projecting axially from the base in a second direction opposite the first direction;
wherein the fan assembly includes at least one opening for receiving the at least one protrusion; and
wherein a portion of the at least one protrusion extends through and beyond the opening of the fan assembly when the fan assembly is mounted on the claw-pole segment and expands in response to an application of an axial load, to secure the fan assembly to the claw-pole segment.

21. The system of claim 12, wherein the plurality of blades are arranged in a non-repeating pattern in which each blade is set at a different angle.

22. The system of claim 12, wherein the plurality of blades are arranged in a non-repeating pattern in which the spacing between the blades is non-repeating.

23. The system of claim 12, wherein the plurality of blades are arranged in a non-repeating pattern in which each blade is sized differently.

24. The system of claim 12, wherein the plurality of blades are arranged as intermeshed sets of blades.

* * * * *